Sept. 15, 1936.   T. C. DELAVAL-CROW   2,054,580

LEAKPROOF SEAL AND THE LIKE

Filed Oct. 26, 1932

INVENTOR:
THOMAS C. DELAVAL-CROW,
BY
HIS ATTORNEY.

Patented Sept. 15, 1936

2,054,580

UNITED STATES PATENT OFFICE 2,054,580

LEAKPROOF SEAL AND THE LIKE

Thomas C. Delaval-Crow, Bristol, Conn., assignor, by mesne assignments, to General Motors Corporation, Detroit, Mich., a corporation of Delaware Application October 26, 1932, Serial No. 639,603

11 Claims. (Cl. 286—5)

This invention relates to leakproof seals and the like and comprises all of the features of novelty herein disclosed. An object of the invention is to provide improved means for sealing the space between relatively rotatable parts, such as bearing race rings, to circumvent leakage of lubricant from the bearing or admission of foreign matter to the bearing. Another object is to provide a bearing seal utilizing capillary attraction to retain lubricant when the bearing is stationary and utilizing a slinger to retain lubricant when one part of the bearing is rotating. Another object is to provide efficient sealing means which eliminates the necessity of holding a number of parts to a definite size, thereby providing a simple, low-cost seal.

To these ends and also to improve generally and in detail upon devices of this character, the invention consists in the various matters hereinafter described and claimed. In its broader aspects, the invention is not necessarily limited to the specific constructions selected for illustrative purposes in the accompanying drawing in which Fig. 1 is a cross sectional view, much larger than natural size, of a portion of an antifriction bearing showing two related forms of sealing devices.

Figure 1:
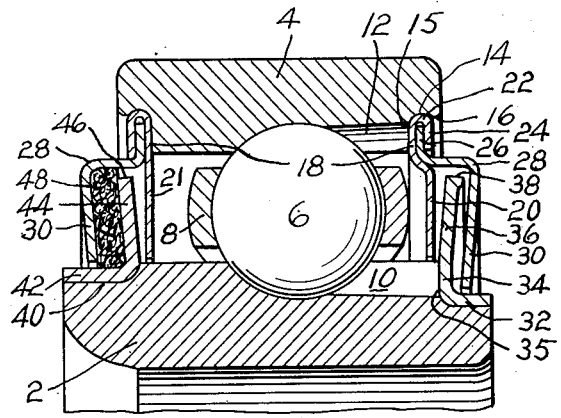

In Fig. 1, there is shown a portion of a bearing having an inner race ring 2, an outer race ring 4, and a series of rolling elements 6, preferably balls, held by a separator 8. The bearing illustrated has filling slots 10 and 12 for inserting the balls into their raceways. Near one side, the bearing has a circular groove 14 or recess between a shoulder 15 and an annular land 16. A washer 18 has a flat portion abutting against the shoulder 15 and closing the filling slot 12. Another portion 20 is cupped or dished to provide clearance with the separator 8 and extends into close proximity to the inner race ring. The outer portion of the washer has a rounded portion 22 fitting in the groove 14 and expanded into the groove by the bending of a flap 24 around the outer flange 26 of a cupped washer 28. The washer 28 also has an inner flange 30 extending down close to the inner race ring which has an annular recess or notch to receive a flange 32 at the inner periphery of a washer 34.

The washer 34 has a flat portion which abuts against a shoulder 35 and closes the filling notch 10. The washer also has a conical flange or slinger 36 entering the groove formed by the washer part 20 and the flange 30. The inner surface of the flange 36 makes an angle of about 5° with the outer surface of the washer part 20. This is to make a narrow tapering recess which will tend to hold lubricant in the bearing by capillary attraction. At its outer periphery, the slinger has an enlargement provided with a surface 38 which lies at an angle of about 5° to the adjacent washer part 28, thereby forming a second capillary recess tending to hold the lubricant in the bearing. The outer face of the slinger and the inner face of the flange 30 are parallel or uniformly spaced and relative rotation tends to pump lubricant in a direction to retain it in the bearing. The terminal portion of the flange 30 makes a capillary angle with the adjacent portion of the washer 34 and the direction of taper is such as to exclude foreign matter from the bearing.

At the opposite side of the bearing the construction is similar. The washer 18, instead of being dished, has a straight portion 21 extending close to the inner race ring. A long, shallow notch 40 in the inner race ring receives a flange 42 on a slinger 44 corresponding to the slinger 36 and also making an angle of about 5° with the washer 21. The outer edge 46 of the slinger has a face making a capillary angle of about 5° with the cupped washer 28. Between the slinger 44 and the flange 30 which is parallel to it is inserted a yieldable fibrous washer 48 of packing felt or the like to retain lubricant in the bearing and exclude foreign matter.

Figure 2:
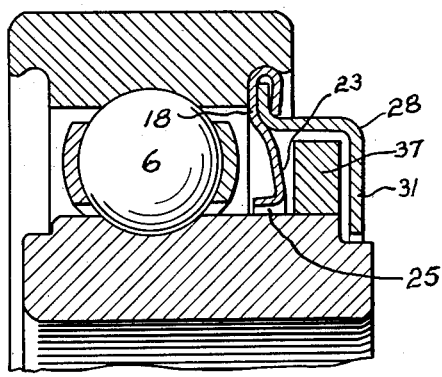
Fig. 2 is a similar view of a modification.

In Fig. 2, the construction is similar to that of Fig. 1 but the slinger 37 is a plain washer pressed on the inner race ring. Its outer side face is parallel to a straight flange 31 of the cupped washer 28. The washer 18 is provided with a tapering portion 23 which makes a capillary angle of about 5° with the inner side face of the slinger 37. The tapering portion terminates in an inwardly bent flange 25 which makes a capillary angle of about 5° with the outer periphery of the inner race ring. Thus the washer 18 has two portions forming walls of capillary recesses which tend to hold lubricant in the bearing especially when the latter is stationary. When the inner race ring rotates, the slinger tends to retain lubricant in the bearing and any tendency to suck or pump foreign matter into the bearing is overcome or minimized by the pressure built up in the lubricant at the interior of the bearing.

Figure 3:
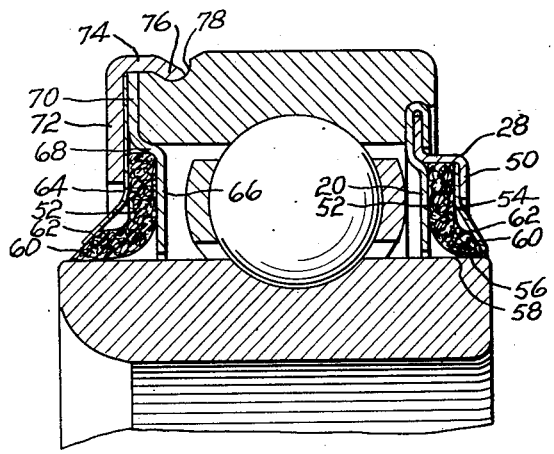
Fig. 3 is a similar view of a bearing having two related forms of sealing devices.
Figure 4:
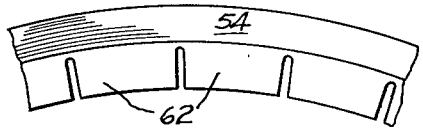
Fig. 4 is a detail view of a portion of a spring washer.

At the right of Fig. 3, a short flange 50 on the cupped washer 28 is parallel to the washer part 20 and forms a groove with the latter to receive and hold a yieldable washer 52 and a metal washer 54. The yieldable washer is preferably made of leather and has an axial extension or flap 56 which engages a smoothly ground surface 58 on the inner race ring. The edge of the extended portion is bevelled as at 60 for engagement with a spring flange 62 on the washer 54. The spring flange is desirably divided up into a plurality of spring fingers by a plurality of radial slits. The spring flange presses against the bevelled edge and produces both an axial and a radial component of pressure. A flanged leather washer is more easily contracted to engage a race ring by a laterally directed pressure or component than by a single radially acting force, as occurs, for instance, when the common form of coiled spring ring is wrapped around a leather flap. Such spring, acting only radially, must be strong to crowd the leather inwardly and tends to stretch the leather or pull it out of its groove. Also, the pressure is not easily controlled and may cause the leather to press too hard on the race ring and burn. In the present construction, the axial component of pressure counteracts the tendency of the radial component to stretch the leather. Another important advantage of the spring acting on the bevelled edge is that tension of the spring does not vary with the thickness of the leather or with the diameter of the ground surface 58. Hence a uniform and correct amount of pressure to avoid oil leakage or burning of the leather at high speed can be easily obtained because of the elimination of such size factors.

At the left of Fig. 3, the leather washer 52 is held between a metal washer 64 and a flange 66 on an inwardly dished washer 68 whose outer portion 70 abuts against the end of the outer race ring. The parts are held by a flange 72 on a sleeve 74 which enters a notch in the outer periphery of the outer race ring, the terminus 76 of the sleeve being spun or pressed into a groove 78.

I claim:

1. In a seal for relatively rotatable parts, means on one of the parts forming an annular groove, and a slinger carried by the other part and extending into the groove, one side of the slinger making a capillary angle with one wall of the groove, the surfaces forming the angle converging in a direction away from the outer edge of the slinger, and the other side of the slinger being substantially uniformly spaced from the other wall of the groove; substantially as described.

2. In a seal for relatively rotatable parts, means on one of the parts forming an annular groove, and a slinger carried by the other part and extending into the groove, one side of the slinger making a capillary angle with one wall of the groove, the surfaces forming the angle converging in a direction away from the outer edge of the slinger, the other side of the slinger being substantially uniformly spaced from the other wall of the groove, and the free edge of the slinger making a capillary angle with the bottom of the groove; substantially as described.

3. In a seal for relatively rotatable parts, means on one of the parts forming an annular groove, a washer carried by the other part and extending into the groove, one side of the washer making a capillary angle with one wall of the groove, a packing of fibrous material between the other side of the washer and the remaining wall of the groove, and the surfaces forming said angle converging in a direction away from the bottom of the groove; substantially as described.

4. In a seal for relatively rotatable race rings, a washer carried by one of the rings and extended towards the other ring, a washer carried by said other ring and having its side face in closely adjacent relation to the side face of the first washer, the washers being contained in the annular space between the race rings which carry them and the opposing faces gradually approaching one another in one direction to make a converging capillary space tending to attact liquid in the direction of convergence, and the convergence being in a direction towards said other ring to resist leakage away from it; substantially as described.

5. In a seal for relatively rotatable race rings, a washer carried by one of the rings and extended towards the other ring, a washer carried by said other ring and having its side face in closely adjacent relation to the side face of the first washer, the washers being contained in the annular space between the race rings which carry them and the opposing faces gradually approaching one another in one direction to make a converging capillary space the direction of convergence being towards said other ring, and the end portion of one washer also having a surface converging at a capillary angle with respect to a surface carried by the adjacent ring; substantially as described.

6. In a seal for relatively rotatable race rings, a washer carried by one of the rings and extending towards the other ring, a washer carried by said other ring and extending towards said one ring, the washers being contained in the annular space between the race rings which carry them and the end portion of said last mentioned washer being arranged to present a surface converging at a capillary angle with respect to a surface carried by the adjacent ring; substantially as described.

7. In a seal for relatively rotatable concentric members having a lubricant-holding space therebetween and movable elements which agitate the lubricant, a washer secured to the outer member and extending inwardly towards the outer peripheral surface of the inner member, a washer secured to the inner member and extending towards the inner surface of the outer member, both washers being located between the concentric members at one side of the lubricant space and having their side faces closely adjacent and lying at a capillary angle, said adjacent side faces gradually converging towards the free edge of that washer which lies closest to the lubricant space to attract lubricant towards said space; substantially as described.

8. In a seal for relatively rotatable concentric members having a lubricant-holding space therebetween and movable elements which agitate the lubricant, a washer between the members, the washer being secured to the outer member and extending inwardly towards the outer peripheral surface of the inner member, a second washer secured to the outer member and extending towards the outer peripheral surface of the inner member, said washers forming a groove open towards the inner member, a slinger secured to the inner member and extending outwardly between the washers, one side face of the slinger lying close to the side face of that one of the washers nearest to the lubricant and at a capillary angle thereto, said side faces gradually converging towards the outer peripheral surface of the inner member, and a yieldable packing between the other side face of the slinger and the other washer; substantially as described.

9. In a seal for relatively rotatable concentric members having a lubricant-holding space therebetween and movable elements which agitate the lubricant, a washer between the members, the washer being secured to the outer member and extending inwardly towards the outer peripheral surface of the inner member, a second washer secured to the outer member and extending towards the outer peripheral surface of the inner member, said washers forming a groove open towards the inner member, a slinger secured to the inner member and extending outwardly between the washers, one side face of the slinger lying close to the side face of that one of the washers nearest to the lubricant and at a capillary angle thereto, said side faces gradually converging towards the outer peripheral surface of the inner member, and the other side face of the slinger being substantially uniformly spaced from the other washer; substantially as described.

10. In a seal for relatively rotatable concentric members having a lubricant-holding space therebetween and movable elements which agitate the lubricant, a washer between the members, the washer being secured to the outer member and extending inwardly towards the outer peripheral surface of the inner member, a second washer secured to the outer member and extending towards the outer peripheral surface of the inner member, said washers forming a groove open towards the inner member, a slinger secured to the inner member and extending outwardly between the washers, and a yieldable packing between the slinger and that one of the washers which is most remote from the lubricant space; substantially as described.

11. In a seal for relatively rotatable concentric members having a lubricant-holding space therebetween and movable elements which agitate the lubricant, a pair of washers secured to the outer member and extending inwardly towards the outer peripheral surface of the inner member, said washers being spaced apart to form a groove open towards the inner member, a slinger secured to the inner member and extending outwardly between the washers, one side face of the slinger lying close to the side face of one of the washers, the slinger having a flange fitting the outer surface of the inner member, and a packing surrounding the flange and lying between the other side face of the slinger and the other washer; substantially as described.

THOMAS C. DELAVAL-CROW.